UNITED STATES PATENT OFFICE.

CHARLES J. EAMES, OF NEW YORK, N. Y., ASSIGNOR TO THE CARBON IRON COMPANY, OF SAME PLACE.

PROCESS OF DEOXIDIZING IRON ORE.

SPECIFICATION forming part of Letters Patent No. 318,605, dated May 26, 1885.

Application filed February 27, 1885. (No specimens.)

*To all whom it may concern:*

Be it known that I, CHARLES J. EAMES, a citizen of the United States, residing at New York city, in the State of New York, have invented a new and useful Improvement in Processes of Reducing Iron Ore in the Manufacture of Iron and Steel; and I hereby declare the following to be a full, clear, and exact description of the same.

My present invention relates to the process of deoxidizing the ore in the manufacture of sponge and wrought-iron direct from the ore, and the carburization of the metal of the sponge, where it is desired to produce a steely iron therefrom.

To this end it consists, broadly stated, in coating the lumps of ore with a graphitic paste, and then subjecting the ore thus coated to a sustained dull-red heat in any suitable furnace until deoxidation, and, if desired, carburization, takes place.

The graphite preferably employed by me is of a character known in commerce as "graphitic carbon," such as is found at Cranston, Rhode Island, and in other localities, is of an impure character, containing earthy matter and iron in considerable quantity, can be obtained at comparatively low prices, and is known in trade as "graphitic carbon," to distinguish it from "plumbago" of commerce.

Heretofore in the manufacture of iron sponge, wrought-iron, and steely irons from the ore the carbon for purposes of deoxidation and carburization has been employed either as charcoal or soft carbon, or in the form of plumbago. The main objection to the use of charcoal or like carbonaceous matter is the bulk required, its constantly increasing scarcity in manufacturing districts, its advancing price, and the cost of transportation. The principal objections against the use of plumbago in its pulverized state are its liability to drift in the furnace and cause irregular results, its loss in the fusible slag sometimes used as a protecting covering for the ore during treatment, and where used in the form of slabs for furnace-linings, or in solid masses—such as crucibles—its inactive condition until cut by the molten metal or scoria.

In carrying out my invention, and to overcome these several objections, I form a stiff paste or mortar from pulverized graphite and an adhesive carbonaceous binder—such as coal-tar, wood-tar, molasses, or like material—preferably using as much of the graphite and as little of the binder as is consistent with the formation of a paste or mass, which can be readily applied as an adhesive covering to the ore. If desired, a certain per cent. of pulverized fire-brick or its equivalent may be added to the mixture, and by equivalent, as applied to the fire-brick addition, I mean, an ingredient which will not vitrify and destroy the friable character of the covering under the influence of heat. The ore, in the form of lumps as it comes from the mine, or broken into smaller lumps, if desired, is then covered or coated with the graphitic paste or plastic mass, and this can be conveniently done by means of a rotating cylinder, a tank and rakes, and various other means, which will suggest themselves to the operator. The ore so prepared may be then subjected in a suitable furnace to a low-red sustained heat, varying from 1,500° Fahrenheit to 2,000° Fahrenheit, according to the nature of the ore operated on, for from five (5) to seven (7) hours, more or less, until deoxidation has taken place, when an iron sponge will be obtained. The temperature of the furnace can then be raised sufficiently high to cause the agglutination of the metal, and the mass be balled, drawn, and subjected to the blooming apparatus when wrought-iron is desired. If, however, a steely iron is desired, the temperature of the furnace will be only slightly raised—say, from 2,000° Fahrenheit to 2,500° Fahrenheit—or sufficiently high to induce the free metal contained in the sponge to absorb carbon, and this temperature is maintained from three (3) to six (6) hours longer, according to the degree of carburization required, after which the temperature is brought to the stage which will cause the metal to agglomerate, and the mass is balled and treated as hereinbefore specified.

By preference the process is conducted on a friable graphitic sole or hearth such as forms the subject-matter of cases Serial Nos. 144,152, filed September 27, 1884, and 149,822, filed December 9, 1884, and with a covering of graphitic lumps such as forms the subject-matter of case Serial No. 149,684, filed December 6, 1884; but I do not herein claim such hearths and coverings; neither do I limit my invention to use therewith.

Having thus set forth the nature of my invention, what I claim, and desire to secure by Letters Patent, is—

The process herein described for the deoxidation, or deoxidation and carburization, of ore in the manufacture of iron sponge, wrought-iron, and steely iron, which consists in coating the lumps of ore with a graphitic paste, and then subjecting them to a dull-red sustained heat in a suitable furnace, substantially as and for the purposes specified.

In testimony whereof I affix my signature, in presence of two witnesses, this 26th day of February, 1885.

CHARLES J. EAMES.

Witnesses:
F. W. RITTER, Jr.,
G. A. TAUBERSCHMIDT.